United States Patent

[11] 3,562,555

[72] Inventor Richard W. Ahrons
Somerville, N.J.
[21] Appl. No. 665,126
[22] Filed Sept. 1, 1967
[45] Patented Feb. 9, 1971
[73] Assignee RCA Corporation
a corporation of Delaware

[54] MEMORY PROTECTING CIRCUIT
8 Claims, 2 Drawing Figs.

[52] U.S. Cl. 307/238, 307/202, 307/297, 328/67, 328/258
[51] Int. Cl. H03k 1/12
[50] Field of Search 307/296, 202, 238

[56] References Cited
UNITED STATES PATENTS

| | | | |
|---|---|---|---|
| 2,918,573 | 12/1959 | Hollmann | 307/296 |
| 3,002,105 | 9/1961 | Cady | 307/296 |
| 3,049,623 | 8/1962 | DuVall | 307/296 |

*Primary Examiner*—Donald D. Forrer
*Assistant Examiner*—Harold A. Dixson
*Attorney*—H. Christoffersen

ABSTRACT: A circuit for monitoring the power supply for a memory system which is arranged to inhibit operation of the memory system during a power supply failure while maintaining a temporary supply of power to the memory system.

INVENTOR
RICHARD W. AHRONS
BY H. Christoffersen

MEMORY PROTECTING CIRCUIT

BACKGROUND OF THE INVENTION

The conventional volatile computer memory is operated by current or voltage pulses or by the coincidence of pulses whereby information is selectively read therefrom or written into predetermined memory location. The information stored in such memories is normally destroyed or, at least, altered whenever the alternating current line voltage supply for the memory system falls below acceptable limits. Since such power failure is characteristically slow compared with the usual computer and computer memory speeds, a plurality of memory operation cycles can occur while the supply power is falling in level. During this time, the memory driving currents will have variable amplitudes. The result of applying such improper driving currents to the memory can be a destruction of the stored information and the improper storage of input information. Additionally, the logical control of the memory system is lost by such a power failure and large currents may be applied to the memory circuits which can lead to physical damage of the memory system. In the case of volatile memory systems which use active bistable devices to store information, e.g., an MOS type memory, all the stored information can be lost even though the power failure is transitory in nature. Such a loss of stored information is obviously very costly in terms of useful computer time since problems usually have to be restarted and the memory information reentered. In the case of a real time computer application, such as process control, the control over the physical system may be lost with the possibility of disastrous results. Accordingly, the present invention is arranged to provide a computer memory-protecting system for preventing loss of information from the memory during a loss of memory supply power and to inhibit the memory operation upon the occurrence of a power supply fault.

BRIEF SUMMARY OF THE INVENTION

The present invention is a memory-protecting circuit which is arranged to monitor the operating state of a memory system power supply and to provide an output signal indicative of a proper supply operation. This output signal is used to control the read-write logic for information flow in the memory system. Upon a failure of the power supply, this output signal is terminated and the memory system is isolated from further operation by read-write logic. Further, the memory protecting system is arranged to provide a temporary supply of power which could be used in the case of active device memories to maintain their quiescent state whereby to save the memory contents.

DETAILED DESCRIPTION OF THE INVENTION

Figure 1:
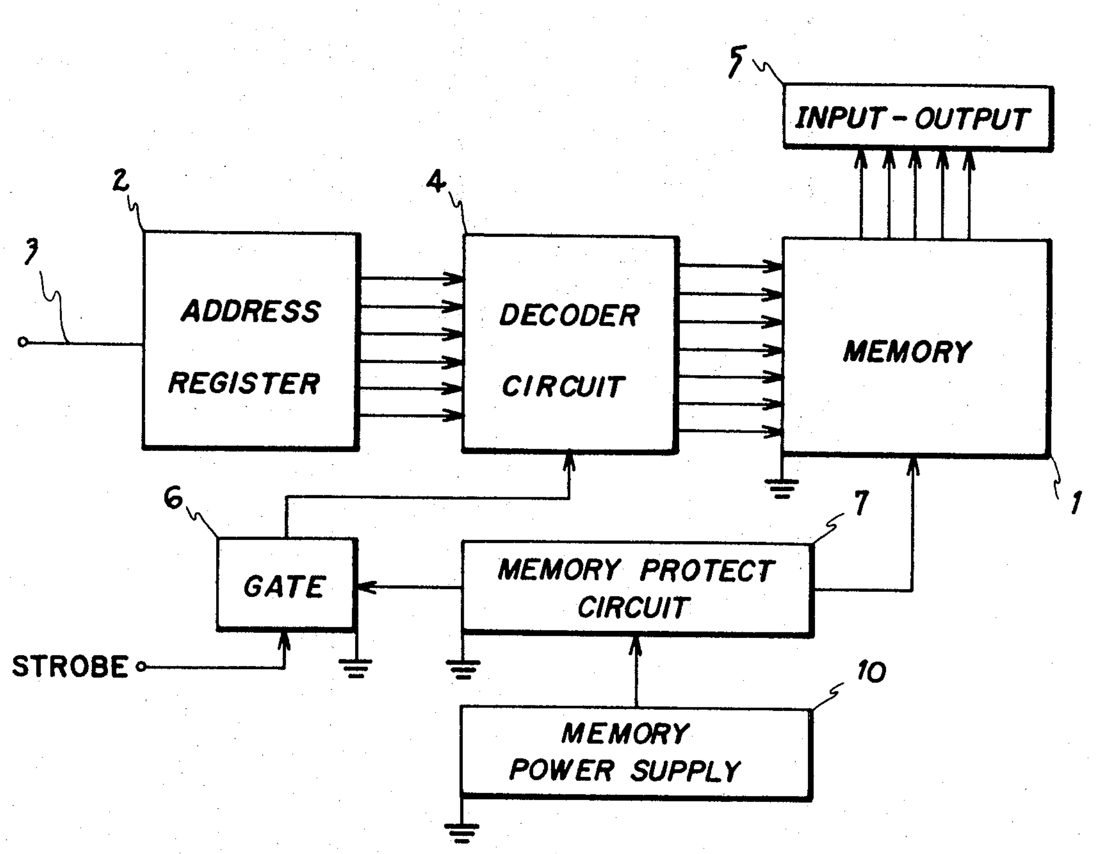
FIG. 1 is a block diagram of a computer memory system utilizing the present invention.

Referring to FIG. 1 in more detail, there is shown a block diagram of a computer memory system using the present invention. A memory system 1, which may be a magnetic type, such as a magnetic core, thin film, magnetic wire, etc., an active bistable type, such as bipolar transistor, MOS, etc. or any other suitable storage arrangement, is arranged in a conventional configuration for receiving input information for storage in predetermined locations and for reading out stored information. An address register 2 is arranged to select storage locations in the memory 1 under control of externally generated signals, e.g., digital computer control signals, applied to an input line 3. The output signals from the address register 2 are applied to a decoder circuit 4 to be decoded into storage location selection signals for the memory 1. An input-output signal means 5, such as a register means, is connected to the memory 1 to supply new data to the memory 1 or to receive signals therefrom. The address register 2, the decoder circuit 4 and the input-output means 5 may be conventional devices which are well known in the art. An MOS memory system for which the present invention has particular utility is shown on page 77 of the "Digest of Technical Papers" of the 1967 INTERNATIONAL SOLID-STATE CIRCUITS CONFERENCE of Feb. 1967. A "strobe" signal is applied to the decoder circuit 4 through a gate circuit 6. The "strobe" signal is arranged to trigger the decoder circuit 4 to produce an output signal therefrom. The gate 6 is controlled by an output signal from a memory protect circuit 7. A suitable circuit for the memory protect circuit 7 is shown in FIG. 2 and described more fully hereinafter.

The memory system 1 is supplied with power from a memory power supply 10. The power supply 10 is connected to the memory 1 through the memory protect circuit 7. The memory protect circuit 7 is arranged to sense the operation of the power supply 10 and to provide an enabling signal for controlling the gate 6 during a proper operating state of the power supply 10. Further, the memory protect circuit 7 is arranged to provide a temporary source of power to the memory 1 during transient failure of the power supply 10. Thus, a failure of the power supply 10 is sensed by the protect circuit 7 which is effective to prevent "strobe" signals from passing through the gate 6 during the duration of the failure and to maintain a supply of power to the memory 1 during the time of the failure. When the fault in the power supply 10 is corrected and the normal memory power is restored, the memory protect circuit 7 is arranged to again enable the gate 6 to allow the "strobe" signals to be applied to the decoder 4. Accordingly, during a failure of the power supply 10, the memory protect circuit 7 is effective to prevent information from either being read into or read out of the memory 1 while the stored information in the memory 1 is protected by a continuing supply of power.

Figure 2:
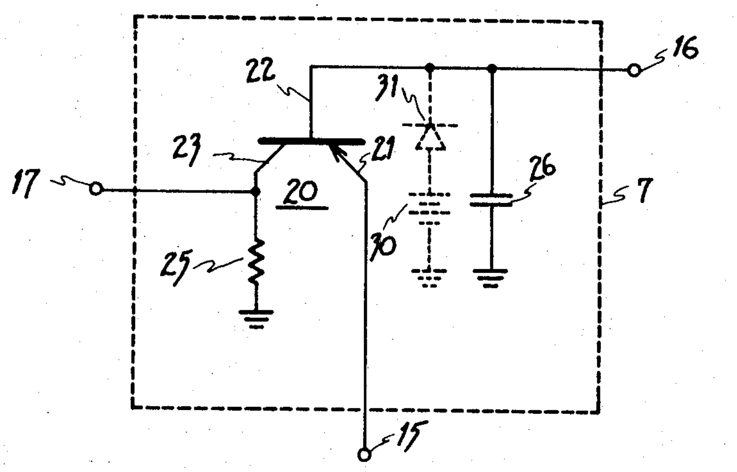
FIG. 2 is a schematic diagram of a novel memory protection control circuit suitable for use with the system shown in FIG. 1.

A suitable circuit for the memory protect circuit 7 is shown in FIG. 2. An input terminal 15 is arranged to be connected to the output of the power supply 10 of FIG. 1 while a first output terminal 16 is arranged to be connected to the power input line of the memory 1 shown in FIG. 1. A second output terminal 17 is arranged to be connected to the gate 6 of FIG. 1 to apply a control signal thereto. A transistor 20 has its emitter 21 connected to the input terminal 15. The base 22 of the transistor 20 is connected to the first output terminal 16 while the collector 23 of the transistor 20 is connected both to a ground, or reference potential, terminal through a resistor 25 and to the second output terminal 17. A capacitor 26 is connected between the first output terminal 16 and a ground terminal.

In operation, the transistor 20 is arranged to conduct a current through its emitter-base junction to provide a current path between the input terminal 15 and the output terminal 16. Accordingly, if the terminal 15 is connected to the power supply 10, the power supply 10 is able to supply current to the memory system 1 which is connected to the output terminal 16. Since the voltage of the power supply minus any drop in the emitter-base diode is supplied at the output terminal 16, the capacitor 26 is initially charged to this voltage level and maintained in a charged state. Concurrently, the transistor 20 is conducting a collector current having a value determined by the current gain B of the transistor 20. If the current through the emitter-base diode is "I," then the collector current is "BI." This collector current produces a voltage drop across the resistor 25 which voltage level is present at the collector 23. This voltage signal is applied to the output terminal 17 to be used as a control signal for the gate 6 shown in FIG. 1. The value of the resistor 25 is chosen to provide a collector voltage for a collector current resulting from an average current drawn by the memory 1, which voltage is approximately equivalent to the voltage at the base of the transistor 20. This operating condition will insure the level of the output control signal since the transistor 20 is operated in a "saturated" state with respect to the collector current.

A failure or transient fault of the power supply 10 is effective to reduce the voltage supplied by the power supply 10 to the first output terminal 16 below the level stored on the capacitor 26. The voltage on the capacitor 26 is then effective to back-bias the emitter-base junction of the transistor 20, and the current from the supply 10 passing through this junction is terminated. Concurrently, the current through the collector resistor 25 is cut off by transistor action which is effective to eliminate the control signal on the terminal 17 which was produced by the voltage drop across the resistor 25. This transistor action would be sufficiently fast to cut off the resistor current in the usual time required for a power supply failure, e.g., 1 to 2 milliseconds. Since this collector voltage is used as the trigger control signal for the gate 6, the failure of the power supply described above is effective to prevent the "-strobe" signal from being applied to the decoder 4. Accordingly, the memory system 1 is isolated from further reading or writing operations.

The emitter-base junction prevents the capacitor 26 from discharging through the power supply 10, and the charge on the capacitor 26 is available as an emergency power source to supply the current requirements of the memory 1. In the case of an active device memory, such as an MOS deice memory, the memory will draw a current to maintain the quiescent states of its storage elements. If a long term or large current emergency current supply for the memory 1 is anticipated, then the capacitor 26 can be augmented or substituted by a battery 30 and a diode 31, shown in dotted form in FIG. 2, connected in series and paralleling the capacitor 26. The diode 31 is used with a battery 30 that is not to be charged by the power supply while in the case of a battery 30 that can be continuously charged, the diode 31 may be eliminated. It is to be noted that, in the circuit of FIG. 2, a PNP transistor is used for positive power supplies; and an NPN transistor would be used for negative power supplies.

I claim:

1. A circuit comprising a transistor having a base, emitter and collector, an input terminal arranged to be connected to a power supply, first circuit means connecting said emitter to said terminal, a first output terminal, second circuit means connecting said vase to said output terminal, a second output terminal, third circuit means connecting said collector to said second terminal, a resistor connected between said collector and a point of reference potential, and a source of emergency power connected to said first output terminal and operative upon a fault of said power supply to reverse bias the emitter-base junction of said transistor while supplying power to said first output terminal, said source comprising a battery and a diode connected in series with the battery and poled to allow current flow from said battery.

2. A combination comprising a transistor having a base, emitter and collector, an input terminal arranged to be connected to a power supply, first circuit means connecting said emitter to said terminal, a first output terminal, second circuit means connecting said base to said first output terminal, a volatile memory system, means connecting said output terminal to said memory to supply power thereto, a second output terminal, third circuit means connecting said collector to said second terminal, a resistor connected between said collector and a point of reference potential, a signal-gating means operative to control the operation of said memory and fourth circuit means connecting said second output terminal to said gating means to apply a control signal thereto derived from a voltage across said resistor.

3. A combination as set forth in claim 2 and including a source of emergency power connected to said first output terminal which source is operative upon a fault of said power supply to supply power to said memory system.

4. A combination as set forth in claim 3 wherein said source is a capacitor.

5. A combination comprising memory means, a first power supply means for said memory means, switching means arranged to normally connect said first power supply means to said memory means, a second power supply means for said memory means, means responsive to a proper operation of said first power supply and operative upon an improper operation thereof to operate said switching means to disconnect said first power supply means from said memory means and to supply power to said memory means, memory-addressing means for addressing said memory means, and inhibit means responsive to a disconnect operation of said switching means by said second power supply means to inhibit said memory-addressing means to prevent further addressing of said memory.

6. The combination as set forth in claim 5 wherein said switching means includes a transistor having a base-emitter junction providing a current path between said memory means and said first power supply means.

7. The combination as set forth in claim 6 wherein said second power supply means includes a capacitor arranged to back-bias said emitter-base junction upon the failure of said first power supply means.

8. The combination as set forth in claim 6 wherein said switching means includes a resistor connected between a collector of said transistor and a point of reference potential and said inhibit means includes gating means responsive to a signal developed across said resistor.